United States Patent [19]

Noda

[11] 4,394,991
[45] Jul. 26, 1983

[54] DOUBLE BEARING FISHING REEL
[75] Inventor: Hideo Noda, Sakai, Japan
[73] Assignee: Shimano Industrial Company Limited, Osaka, Japan
[21] Appl. No.: 222,990
[22] Filed: Jan. 6, 1981
[30] Foreign Application Priority Data
Jan. 24, 1980 [JP] Japan ................................ 55-7861[U]
[51] Int. Cl.³ .............................................. A01K 89/00
[52] U.S. Cl. ................................ 242/84.1 R; 242/212; 242/221
[58] Field of Search ................................. 242/211–221, 242/84.21 R, 84.1 R

[56] References Cited
U.S. PATENT DOCUMENTS

| | | | |
|---|---|---|---|
| 2,425,492 | 8/1947 | Severson | 242/84.1 R |
| 2,578,477 | 12/1951 | Hurd | 242/84.1 R |
| 2,918,227 | 12/1959 | Mauborgne | 242/84.21 R |
| 3,107,876 | 10/1963 | Ament | 242/84.21 R |
| 4,222,537 | 9/1980 | Noda | 242/212 |
| 4,232,842 | 11/1980 | Noda | 242/212 |

*Primary Examiner*—Billy S. Taylor
*Attorney, Agent, or Firm*—Stevens, Davis, Miller & Mosher

[57] ABSTRACT

A fishing reel carrying a spool shaft which has a spool and is journalled through first and second bearing cylinders to a pair of first and second side frames opposite to each other, the spool shaft extending at its one axial end through the second side frame and extending outwardly therefrom, so that the extending shaft portion supports a tubular shaft having a pinion engageable with a driving gear. At the second bearing cylinder provided at the second side frame is formed a support arm extending in parallel to the extending shaft portion, so that the support arm directly or indirectly supports the extending shaft portion.

8 Claims, 6 Drawing Figures

DOUBLE BEARING FISHING REEL

FIELD OF THE INVENTION

This invention relates to a fishing reel, and more particularly to a fishing reel which has a spool shaft having a spool and journalled to a pair of first and second side frames opposite to each other at a regular interval, so that a handle is turned to rotate the spool to thereby wind a flashing line thereon.

BACKGROUND OF THE INVENTION

Generally, a fishing reel having a spool shaft journalled at both axial ends thereof to a pair of first and second side frames, has been well-known. The spool shaft is provided with an extending shaft portion which extends through the second side frame and extends outwardly therefrom, the extending shaft portion carrying a tubular shaft having a pinion and being slidable between the position where the tubular shaft engages with the spool shaft and the position where the tubular shaft disengages from the spool shaft. The pinion engages with a driving gear supported to an input shaft carrying a handle, so that a driving force is transmitted from the driving gear to the spool shaft through the tubular shaft, thereby rotating the spool.

There are two methods for journalling the spool shaft to the first and second side frames, one of which is that the spool shaft is journalled at one axial end thereof to the first side frame and an outer end of the extending shaft portion carrying the tubular shaft is journalled to a housing provided outside the second side frame, and the other is that the spool shaft is journalled at its one axial end to the first side frame and at an intermediate portion to the second side frame.

In the former method, the spool shaft length between bearings is excessive and is subjected to a load from the fishing line resulting in deflection of the shaft. Hence, the deflection moves the spool radially thereof, so that flanges at both axial sides of the spool are brought into contact with the inner periphery of an annular socket at each side frame to thereby apply a greater resistance to the rotation of the spool.

To overcome the above problem, the spool shaft diameter is increased, but this increases the weight. On the other hand, if the gap between the outer periphery of each flange and the inner periphery of the annular socket is made larger, the flange's outer periphery, even when the spool shaft deflects, is free from contact with the inner periphery of the annular socket, thereby solving the above problem. The gap, however, is large enough to allow the fishing line, when unloaded, to enter into the gap. Hence, the aforesaid problem is not well solved.

In the latter method, the spool shaft is made smaller in length between both bearings to avoid the problem of deflecting the spool shaft. However, the extending shaft portion of the spool shaft supporting the tubular shaft is put in a cantilever condition, whereby when the spool is subjected to a greater load for winding the line and a driving force increases which is transmitted from the driving gear to the spool shaft through the pinion, the extending shaft portion deflects, thus creating the problem that the pinion disengages from the driving gear, or teeth of each gear are one-sidedly worn out.

SUMMARY OF THE INVENTION

This invention has been designed in order to overcome the aforesaid problems. An object of the invention is to provide a fishing reel which is capable of eliminating deflection of a spool shaft and also a deflection of the extending shaft portion when cantilevered, even when the spool is subjected to a greater load, and of preventing the line, when wound onto the spool, from jumping from each flange of the spool and entering the gap between the flange and each side frame, thereby enabling the spool to always smoothly rotate.

The fishing reel of the invention has the spool shaft journalled to the first and second side frames opposite to each other, the spool shaft being made sufficiently small in length between both bearings to thereby prevent the creation of a deflection on the spool shaft, and is provided at the first and second side frames with first and second bearing cylinders for the spool shaft, so that at the second bearing cylinder a support arm is provided which extends in parallel to the extending shaft portion perforating through the second side frame and extending outwardly therefrom, the support arm being provided with a support member bored with a shaft bore for the extending shaft portion, so that the support member supports the extending shaft portion to eliminate a deflection created thereon.

In other words, the fishing reel of the invention is so constructed that the spool shaft is journalled through first and second bearing cylinders to a pair of first and second side frames connected opposite to each other at a regular interval, and the extending shaft portion of the spool shaft is supported by the support member at the support arm extending in parallel to the extending shaft portion from the second bearing cylinder. Hence, even when a greater load is applied to the fishing line wound onto the spool by operating the handle, no deflection is created in the spool shaft supported by the first and second bearing cylinders. Also, even when a load applied to a tubular shaft from a pinion affects the extending shaft portion carrying the tubular shaft, no deflection is created on the extending shaft portion, thereby enabling the tubular shaft to smoothly rotate.

In addition, the method for supporting the extending shaft portion of the spool shaft by the support member, includes its direct supporting by the support member and indirect supporting through the tubular shaft.

The support arm may be separate from the second bearing cylinder and mounted thereon, but is preferably integral with the second bearing cylinder. Hence, an alignment of the second bearing cylinder with a shaft bore at the support member can be carried out during manufacturing but not in assembly, resulting in an easy assembly and a reliable alignment. Also, it is preferable to integrate the second bearing cylinder with the second side frame and the second side frame with a first side frame.

These and other objects of the invention will become more apparent in the detailed description and examples which follow.

DETAILED DESCRIPTION OF THE INVENTION

Figure 1:
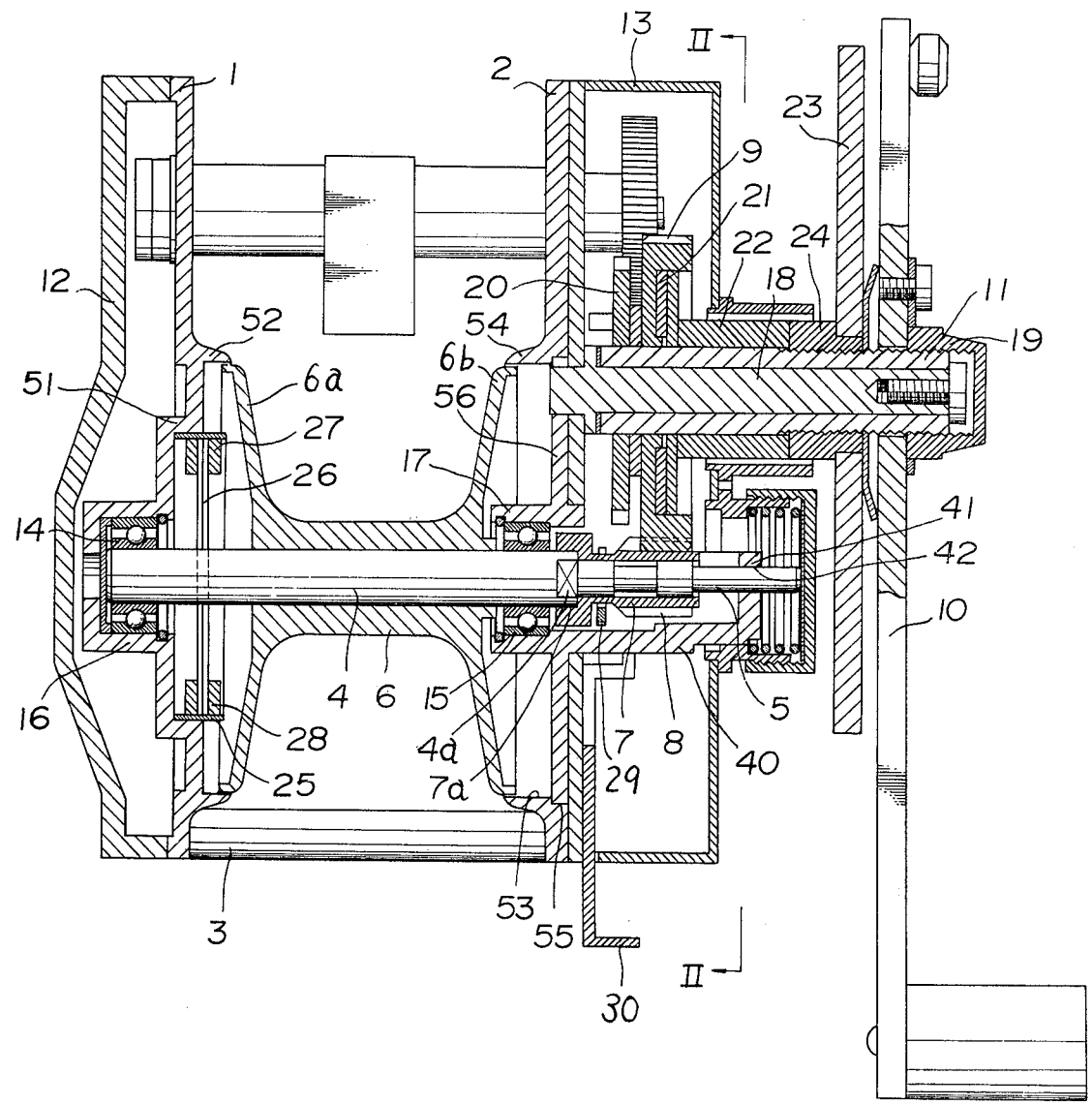
FIG. 1 is a sectional plan view of an embodiment of a fishing reel of the invention.
Figure 3:
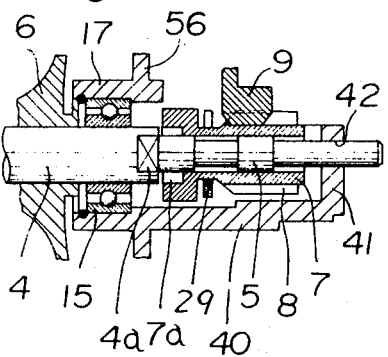
FIG. 3 is a sectional view only of a bearing portion of a spool shaft, showing a tubular shaft which moves from the engaging position with a spool shaft in FIG. 1 to the disengaging position in FIG. 3.

The basic construction of a fishing reel of the invention is well-known. The fishing reel, as shown in FIG. 1, comprises a pair of first and second side frames 1 and 2 connected opposite to each other at a regular interval through connecting rods 3, a spool shaft 4 journalled to the side frames 1 and 2 and having at the end portion with an engaging portion 4a non-circular in section and having an extending shaft portion 5 perforating through the second side frame 2 to extend axially outwardly from the end portion of spool shaft 4, a spool 6 disposed between the side frames 1 and 2 and supported to the spool shaft 4 rotatably together therewith, a tubular shaft 7 which is sleeved on the extending shaft portion 5 and has a pinion 8 and an engageable portion 7a having a non-circular inner periphery engageable with the engaging portion 4a, the tubular shaft 7 being slidable between the position where the engageable portion 7a engages with the engaging portion 4a as shown in FIG. 1 and the position where the engageable portion 7a disengages from the engaging portion 4a as shown in FIG. 3, a driving gear 9 always in mesh with the pinion 8, and an input shaft 11 having a handle 10 and supporting the driving gear 9. The tubular shaft 7 is kept in the above engaging position and the handle 10 is turned to rotate the driving gear 9, so that the rotation thereof is transmitted to the spool shaft 4 through the pinion 8, thereby winding a fishing line onto a spool 6 fixed to the spool shaft 4. The tubular shaft 7 is placed at the above disengaging position to allow the spool 6 to freely rotate together with the spool shaft 4, thereby permitting casting of the line.

Figure 6:
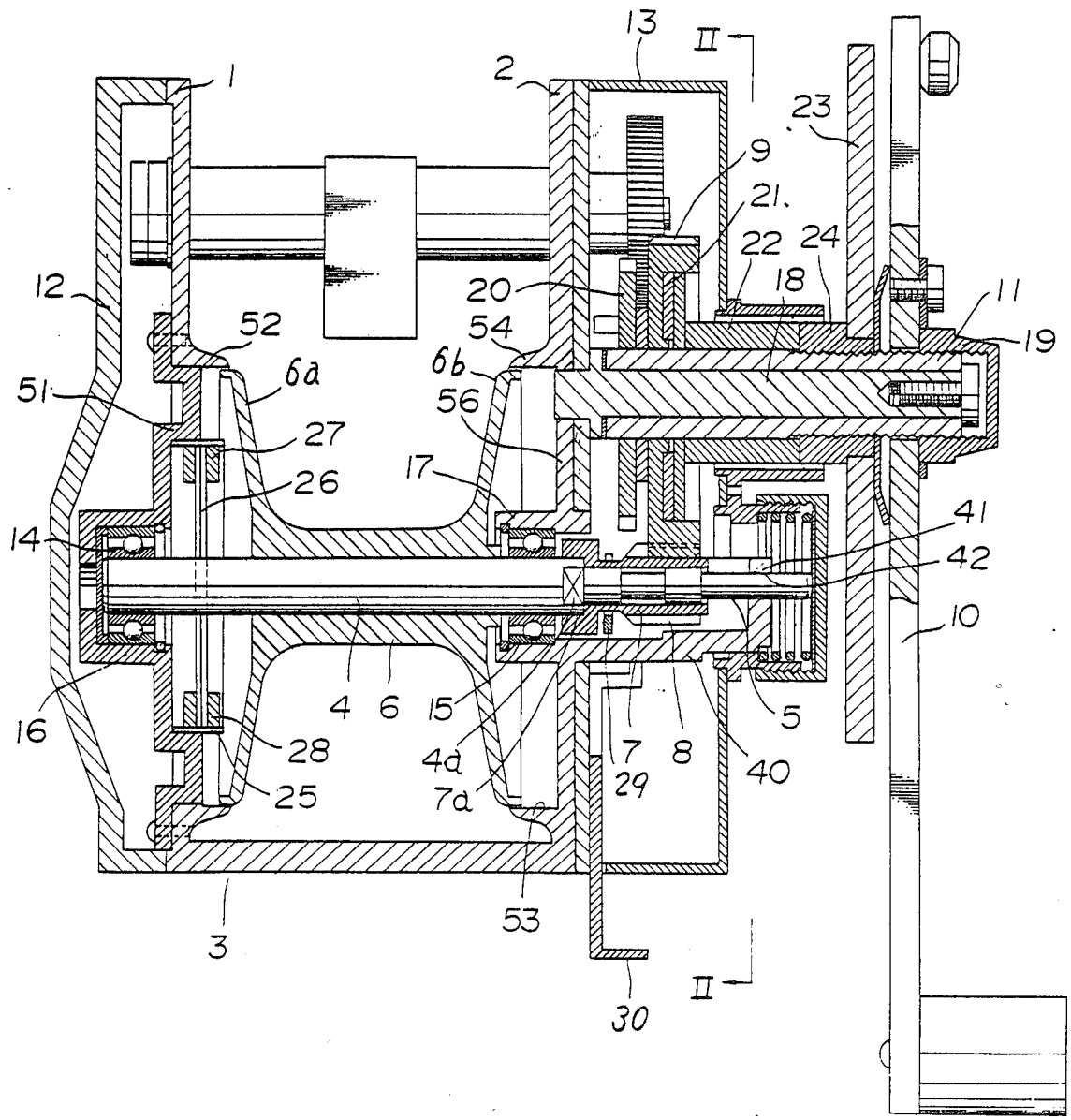

The first and second side frames 1 and 2 may be integral with the connecting rods 3 (FIG. 6) or be separate therefrom and fixed with the rods 3 (FIG. 1). In either case, the first side frame 1 is provided at the outside with a cover 12 and the second side frame 2 with a housing 13 and both the side frames 1 and 2 have at central portion thereof bearing cylinders 16 and 17 accommodating therein ball bearings 14 and 15 respectively.

The input shaft 11 comprises a tubular shaft and is supported rotatably to a support shaft 18 fixed to the second side frame 2. The utmost end of input shaft 11 projects outwardly from the housing 13 and is screwed with the handle 10 by use of a screw means 19. At the inner end of the input shaft 11, a return plate 20 is fixed and the driving gear 9 is rotatably supported. A friction plate 21 and a tubular body 22 are supported outside the driving gear 9 in non-rotatable relationship with respect to the input shaft 11, and an adjusting member 24 having a control plate 23 is screwed with the input shaft 11 axially outwardly from the tubular body 22. The adjusting member 24 is tightened to press-contact the friction plate 21 against the driving gear 9, thereby transmitting the rotation of input shaft 11 to the driving gear 9.

In addition, in FIG. 1, reference numeral 25 designates a brake drum provided at the first side frame 1, and 26 designates a rod fixed to the spool shaft 4 and carrying brake shoes 27 and 28 which contact with the brake drum 25 and are freely fitted to the rod 26. The brake shoes 27 and 28, when the spool shaft 4 freely rotates at a given speed range, move radially outwardly of the brake drum 25 by a centrifugal force to contact with the inner periphery of drum 25, thereby braking the spool shaft 4 to prevent a backlash generated during free rotation of the spool shaft 4.

Figure 2:
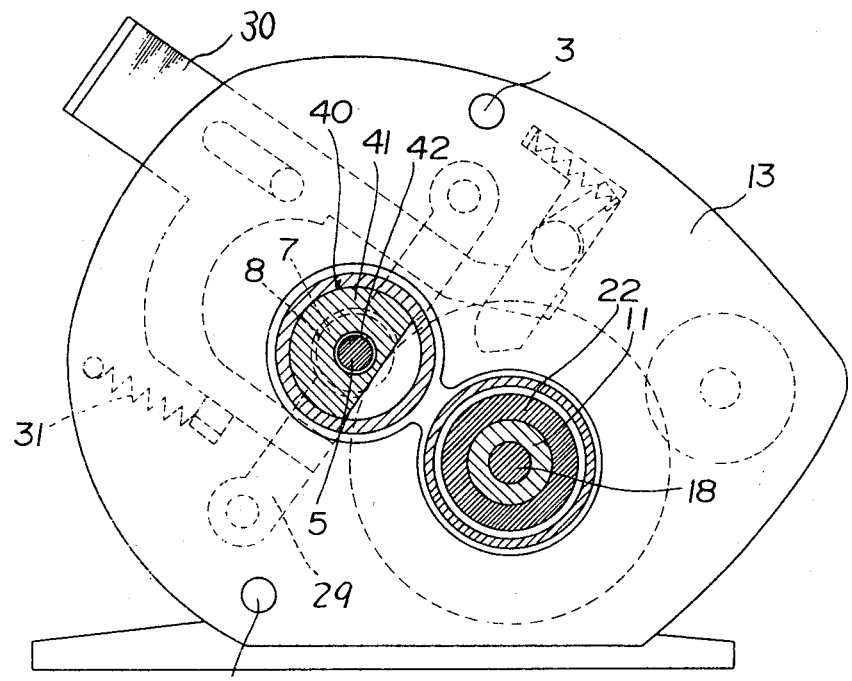
FIG. 2 is a sectional view taken on the line II—II in FIG. 1.

In FIGS. 1 and 2, reference numeral 29 designates a holder for holding the tubular shaft 7, 30 designates a clutch control plate which slidably controls the tubular shaft 7 axially of the extending shaft portion 5 through the holder 29. The control plate 30 is pushed to move the tubular shaft 7 rightwardly in FIG. 1 to thereby keep the spool shaft 4 in its freely rotating condition. The handle 11 turns to rotate a return plate 20 so that the control plate 30 is moved backward and then a spring 31 functions to return the tubular shaft 7. Hence, the tubular shaft 7 returns to allow the engageable portion 7a to engage with the engaging portion 4a at the spool shaft 4.

The aforesaid construction is not required for the invention, which is basically similar to a well-known fishing reel. The detailed description of construction and function of the reel, is omitted herewith, but will be fully understandable by a person skilled in the art.

In the fishing reel of the invention constructed according to the foregoing, the second bearing cylinder 17 provided at the second side frame 2 is provided with a support arm 40 extending in parallel to the extending shaft portion 5 of spool shaft 4. At an extending end of the support arm 40 is provided a support member 41 bored with a shaft bore 42, the support member 41 supporting the extending shaft portion 5 at the utmost end thereof.

Referring to FIGS. 1 through 3, the first bearing cylinder 16 is formed at the central portion of the first side frame 1 and integral therewith, and the first side frame 1 is provided with a support portion 51 for the brake drum 25, radially outwardly of the first bearing cylinder 16, and with an annular socket 52 for receiving therein a left-hand flange 6a at the spool 6. The second bearing cylinder 17 is separate from the second side frame 2 and provided with a round through bore 53 of a diameter slightly larger than an outer diameter of a right-hand flange 6b at the spool 6. An annular socket 54 for receiving the right-hand flange 6b is provided surrounding the through bore 53, and a fitting portion 55 is provided at the periphery of the through bore 53. A disc 56 fitted into the fitting portion 55 is provided at the second bearing cylinder 17, and the support arm 40 of a semi-cylindrical shape is integrated with the second bearing cylinder 17. The integration of the second bearing cylinder 17 with the support arm 40 enables alignment of the second bearing cylinder 17 with the shaft bore 42 at the support member 41 to be carried out during manufacturing, resulting in an easy assembly of the reel.

Figure 5:
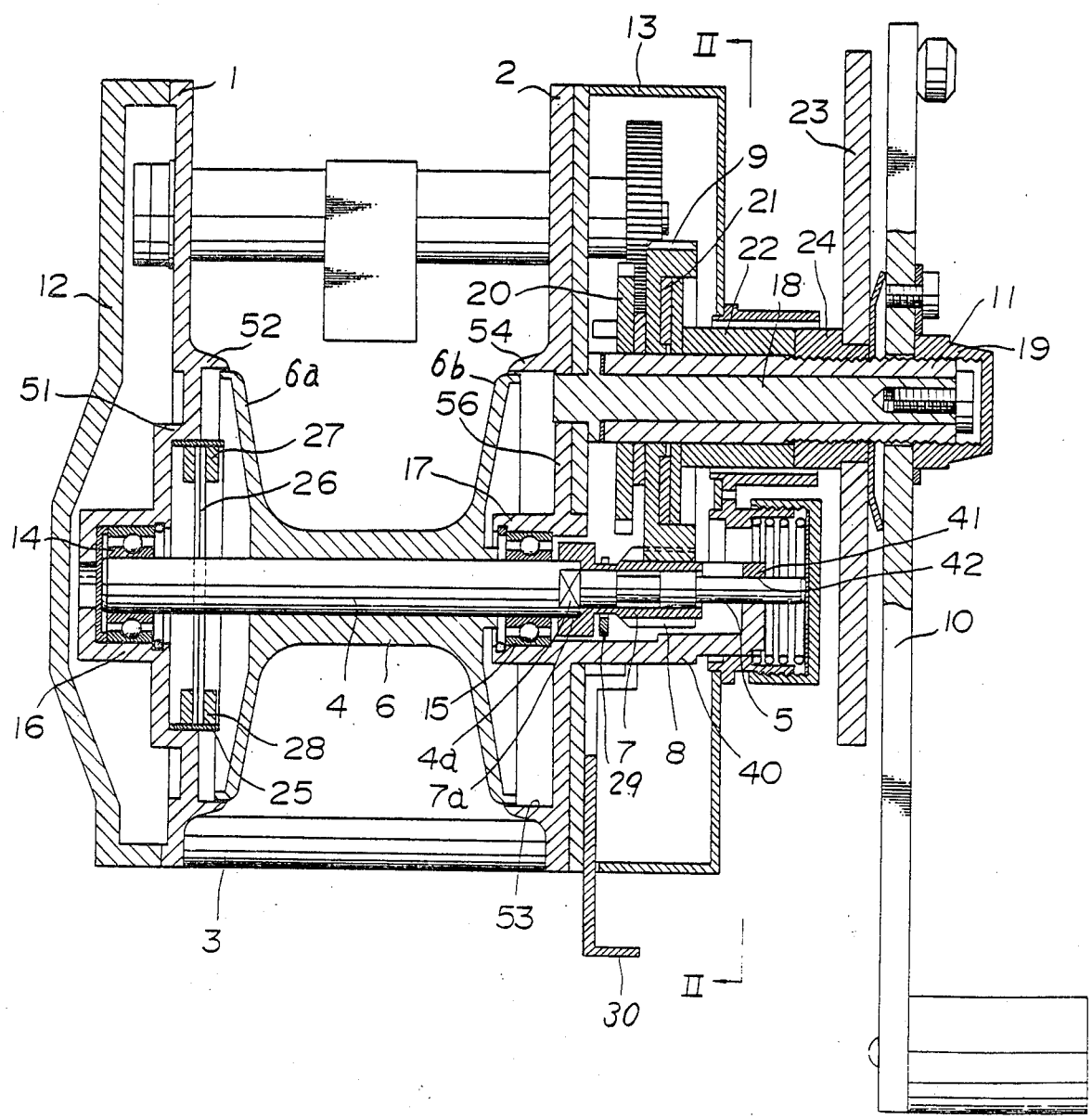
FIG. 5 is a sectional plan view of another modified embodiment, and, FIG. 6 is a sectional plan view of yet another modified embodiment.

The first and second bearing cylinders 16 and 17 may be separate from the first and second side frames 1 and 2, as shown in FIG. 1 but the integral formation of each bearing cylinder with each side frame will facilitate an alignment of the first bearing cylinder 16 with the second bearing cylinder 17. This integral formation is shown in FIG. 5. Furthermore, integral formations of the second side frame 2 with the second bearing cylinder 17 and the second side frame 2 with the first side frame 1, will result in a reliable alignment.

In the aforesaid construction, the spool shaft 4, which is supported to the first and second frames 1 and 2 through the first and second bearing cylinders 16 and 17, can reduce the length between both bearings to a minimum. Hence, the spool shaft 4, even if thinner, is not deflected, and is reduced in weight. The outer peripheries of flanges 6a and 6b at both axial sides of spool 6 can be positioned in close proximity to the inner peripheries of annular sockets 52 and 54 respectively, thereby reducing gaps between the outer peripheries of flanges and the inner peripheries of annular sockets. As a result, there is no fear that the fishing line will enter the gaps to wind around the spool shaft 4.

The extending shaft portion 5, which is supported by the support arm 40, is not at all deflected, and prevents the pinion 8 from disengaging from the driving gear 9, or eliminates one-sided wear at the teeth of both the gears 8 and 9. Furthermore, the support arm 40 extends integrally from the second bearing cylinder 17 supporting one end of spool shaft 4, thereby supporting the extending shaft portion 5 with accuracy.

Figure 4:
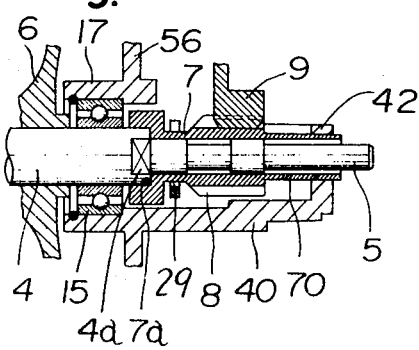
FIG. 4 is a sectional view of a modified embodiment, only showing its bearing portion for a spool shaft.

Alternatively, the tubular shaft 7 supported to the extending shaft portion 5, as shown in FIG. 4, may be provided with an extending tubular shaft portion 70 extending in parallel to the extending shaft portion 5, the extending tubular shaft portion 70 being inserted into the shaft bore 42, so that the extening shaft portion 5 at the spool shaft 4 may be supported indirectly to the support member 41 through the extending tubular shaft portion 70.

While embodiments of the invention have been shown and described, the invention is not limited to the specific construction thereof, which is merely exemplary in the specification rather than defined.

What is claimed is:

1. A fishing reel comprising a pair of first and second side frames connected opposite to each other at a regular interval; a housing mounted adjacent said second side frame to define an enclosed space between said second side frame and housing; a spool shaft rotatably supported between said side frames and having an extending shaft portion extending through said second side frame and extending outwardly therefrom into said space; a spool disposed between said side frames and rotatable with said spool shaft; a tubular shaft being positioned in said space on said extending shaft portion of said spool shaft, slidable between a position where a clutch element on said tubular shaft engages with a clutch element on said spool shaft and a position where said clutch element on said tubular shaft disengages from said clutch element on said spool shaft, and having a pinion; a driving gear mounted in said space and engaging said pinion; an input shaft carrying said driving gear and having a handle; and first and second bearing cylinders mounted adjacent said first and second side frames for journalling said spool shaft, said second bearing cylinder having a support arm connected therewith and extending into said space in the same direction as said extended shaft portion of said spool shaft, said support arm having at an extending end portion thereof a support member with a shaft bore for supporting said extending shaft portion whereby said support member supports said extending shaft portion.

2. A fishing reel according to claim 1, wherein said second bearing cylinder is formed integrally with said support arm.

3. A fishing reel according to claim 1 or 2, wherein said second bearing cylinder is formed integrally with said second side frame.

4. A fishing reel according to claim 3, wherein said first and second side frames are formed integrally with each other.

5. A fishing reel according to claim 1 or 2, wherein said second bearing cylinder is formed separately from said second side frame, said second side frame having a fitting portion for said second bearing cylinder so that said second bearing cylinder is fit into said fitting portion for connecting with said second side frame.

6. A fishing reel according to claim 5, wherein said second side frame has a round through bore of a diameter larger than an outer diameter of a flange at said spool, said through bore having at its peripheral edge a fitting portion, said second bearing cylinder having at the outer periphery thereof a disc to fit into said fitting portion.

7. A fishing reel according to claim 1, wherein said extending shaft portion at said spool shaft is supported directly to said support member at said second bearing cylinder.

8. A fishing reel according to claim 1, wherein said tubular shaft has a tubular extending shaft portion extending in the same direction as the extending direction of said extending shaft portion at said spool shaft, said tubular extending shaft portion being supported to said support member at said second bearing cylinder, so that said tubular extending shaft portion indirectly supports said extending shaft portion at said spool shaft.

* * * * *